US010860677B2

(12) United States Patent
Wolf

(10) Patent No.: US 10,860,677 B2
(45) Date of Patent: *Dec. 8, 2020

(54) PROVIDING DYNAMIC CONTENT IN CONTEXT OF PARTICULAR EQUIPMENT

(71) Applicant: Applied Materials, Inc., Santa Clara, CA (US)

(72) Inventor: Erik Wolf, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/436,725

(22) Filed: Feb. 17, 2017

(65) Prior Publication Data
US 2017/0161287 A1 Jun. 8, 2017

Related U.S. Application Data

(63) Continuation of application No. 13/770,945, filed on Feb. 19, 2013, now Pat. No. 9,576,032.
(Continued)

(51) Int. Cl.
*G06F 16/958* (2019.01)
*G06F 16/248* (2019.01)
(Continued)

(52) U.S. Cl.
CPC .......... *G06F 16/958* (2019.01); *G06F 16/248* (2019.01); *G06F 16/338* (2019.01); *G06F 16/951* (2019.01); *G06F 16/972* (2019.01)

(58) Field of Classification Search
None
See application file for complete search history.

(56) References Cited

U.S. PATENT DOCUMENTS 7,080,407 B1   7/2006   Zhao et al.
8,543,562 B2   9/2013   Mule
(Continued)

FOREIGN PATENT DOCUMENTS

TW      201346602 A     11/2013
WO      2013-126467 A1   8/2013

OTHER PUBLICATIONS

International Search Report and Written Opinion for PCT/US13/26964, dated Apr. 24, 2013, 7 pages.

*Primary Examiner* — Hau H Hoang
*Assistant Examiner* — Hau Hoang
(74) *Attorney, Agent, or Firm* — Lowenstein Sandler LLP

(57) ABSTRACT

The present disclosure relates to a method that includes receiving input of a search term for a query and identifying a key mapped to the search term. The method further includes identifying a results page template and default data that correspond to the key, obtaining structured data that is associated with the equipment from a data source storing the structured data, and obtaining unstructured data that is associated with the equipment from a data source storing the unstructured data. The method further includes providing a results page via a graphical user interface (GUI), the results page including the results page template populated with the default data and equipment related results for the query. The equipment related results include the structured data that is associated with the equipment and the unstructured data that is associated with the equipment.

17 Claims, 11 Drawing Sheets

Related U.S. Application Data

(60) Provisional application No. 61/602,495, filed on Feb. 23, 2012.

(51) Int. Cl.
  *G06F 16/338* (2019.01)
  *G06F 16/951* (2019.01)

(56) References Cited

U.S. PATENT DOCUMENTS

| | | |
|---|---|---|
| 2004/0024662 A1 | 2/2004 | Gray et al. |
| 2004/0199542 A1 | 10/2004 | Morgan et al. |
| 2004/0205572 A1* | 10/2004 | Fields ............... G06F 16/958 715/234 |
| 2004/0260759 A1 | 12/2004 | Smoliar et al. |
| 2005/0120112 A1 | 6/2005 | Wing et al. |
| 2005/0193055 A1* | 9/2005 | Angel ............... G06Q 30/02 709/202 |
| 2005/0283498 A1* | 12/2005 | Kuo ............... G06F 16/21 |
| 2006/0075228 A1 | 4/2006 | Black et al. |
| 2007/0061128 A1* | 3/2007 | Odom ............... G06F 19/325 704/4 |
| 2008/0294423 A1 | 11/2008 | Castellani et al. |
| 2010/0077008 A1* | 3/2010 | Davis ............... G06F 17/30011 707/797 |

\* cited by examiner

PROVIDING DYNAMIC CONTENT IN CONTEXT OF PARTICULAR EQUIPMENT

RELATED APPLICATIONS

This application is a continuation application of U.S. patent application Ser. No. 13/770,945, filed on Feb. 19, 2013, which claims the benefit of U.S. Provisional Application No. 61/602,495 filed Feb. 23, 2012, the entire contents of both are hereby incorporated by reference.

TECHNICAL FIELD

Implementations of the present invention relate to providing data generally, and more particularly, to providing dynamic content in context of particular equipment.

BACKGROUND

A significant number of equipment, such as manufacturing equipment, military equipment, etc. may be operating at various sites (e.g., customer sites, mission sites, etc.). One or more equipment may experience an operational problem and an onsite customer/field engineer may work with the problematic equipment to address the issue. The engineer may wish to access data about the equipment, such as equipment manuals, data about processes that run on the equipment, maintenance procedures, spares information, repair information, data about products produced by the equipment, safety information, etc. for troubleshooting purposes. Accurate equipment information is often difficult to find and may lead to greater equipment downtime, incorrectly ordered equipment parts, and inefficient use of the engineer's time due to the lack of a standardized search mechanism and service vocabulary. Customer/field engineers typically spend 20% of their time looking for information because they are unaware of the data sources of the information, searching through multiple data sources, and/or continually manually refining a search to attempt a more focused effort. Often times, customer/field engineers encounter search results of hundreds of pages of documents, which may not be relevant to equipment problem.

BRIEF DESCRIPTION OF THE DRAWINGS

Various implementations of the present invention will be understood more fully from the detailed description given below and from the accompanying drawings of various implementations of the invention.

DETAILED DESCRIPTION

Figure 1:
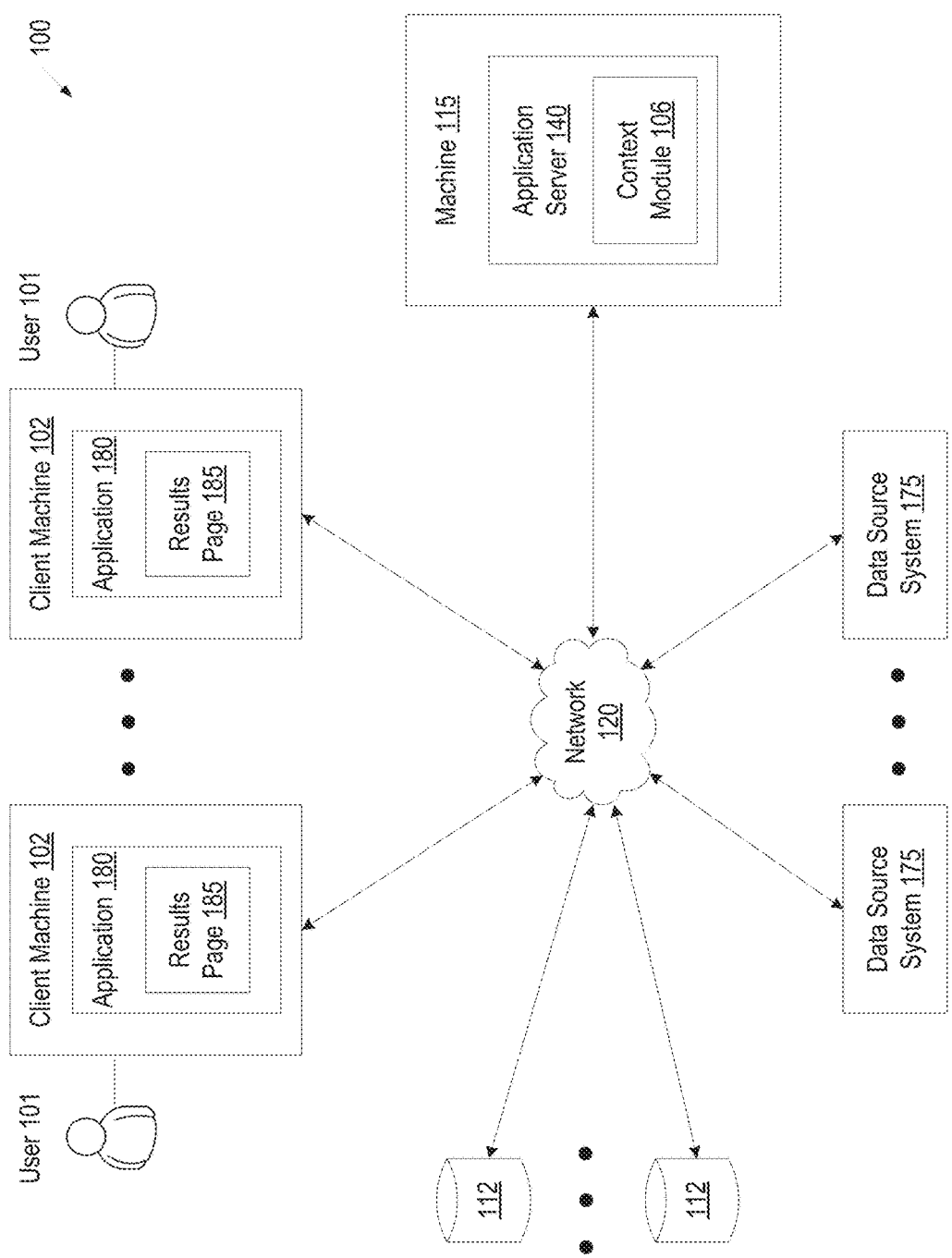
FIG. 1 is a block diagram illustrating system architecture, according to some embodiments.

Implementations of the invention are directed to a method and system for providing dynamic content in context of particular equipment. A computer system receives input of a search term for a query. The query may be for information for, for example, and not limited to, the particular equipment (e.g., military equipment, manufacturing equipment), an engineering design of a product that is manufactured using the particular equipment, an engineering design of the particular equipment, a process that is run on the particular equipment, a manufacturing process run on the particular equipment, a maintenance procedure for the particular equipment, spares for particular equipment, repair of particular equipment, or one or more products associated with the equipment.

The search term is related to equipment. For example, the search term may be a part number, a description of a symptom related to failing equipment, a product name, or a process name. The computer system identifies a key that corresponds to the search term and dynamically obtains content that is associated with the key from multiple data sources. Examples of data sources can include, and are not limited to, a publishing system, a document management system, an email system, a repository system, an engineering design system, a web server, an application server, a parts management system, an inventory system, an ordering system, a manufacturing system, a production system, etc.

The data sources can store structured data that is associated with the equipment. Structured data is data related to some form, such as, and not limited to, database data, form data, field-related data. The data sources can store unstructured data that is associated with the equipment. Unstructured data is data that is not associated with any form, such as, and not limited to, documents, user-provided content in discussion threads, forums, feedback, etc. The computer system automatically populates a results page template associated with the key with the content from the data sources to create a results page that includes the equipment related results for the query.

Implementations increase user (e.g., field engineers, customer engineers, product engineers, etc.) productivity by dynamically providing relevant information in context of particular equipment to make it more efficient for users to locate information. For example, when a user searches for information for Part No. 1235 of Equipment XYZ, implementations may provide a results page that includes an image of the Part No. 1235, a description of Part No. 1235, inventory data for Part No. 1235, ordering information for Part No. 1235, average delivery time for Part No. 1235, a bill of materials for Part No. 1235, user feedback for Part No. 1235, discussion threads discussing Part No. 1235, Notices for Part No. 1235, etc. Implementations can add context to the information and can provide information to users based on the added context. Context hereinafter refers to aggregating information, from various data sources, which have been classified as being related to each other into a group.

FIG. 1 illustrates exemplary system architecture 100 in which embodiments can be implemented. The system architecture 100 includes one or more machines 115, one or more data source systems 175 storing content data in one or more data stores 112, and one or more client machines 102 connected via a network 120. Network 120 may be a public network (e.g., the Internet), a private network (e.g., a local area network (LAN) or wide area network (WAN)), or a combination thereof.

The machines 115 and client machines 102 can be coupled to one or more data source systems 175. The data source systems 175 can include one or more machines coupled to one or more data stores 112. The data source systems 175 can be systems that are related to a production environment, such as a manufacturing plant and a fulfillment center. Examples of data source systems 175 can include, and are not limited to, a publishing system, a document management system, an email system, a repository system, an engineering design system, a web server, an application server, a parts management system, an inventory system, an ordering system, a manufacturing system, a production system, etc. Examples of content data that is stored in the one or more data stores 112 can include, and are not limited to, content from a publishing system, corporate documents, e-mail, manufacturing specifications, part drawings, schematics, internal website content, images, video, presentations, parts management data, inventory data, ordering data, procedures, process data, discussion forum data, etc.

The data stores 112 can be persistent storage that is capable of storing content data for various data source systems 175. As will be appreciated by those skilled in the art, in some embodiments data stores 112 are a network-attached file server, while in other embodiments data stores 112 are some other type of persistent storage such as an object-oriented database, a relational database, and so forth.

The client machines 102 can be personal computers (PC), laptops, mobile phones, tablet computers, or any other computing devices. The client machines 102 may run an operating system (OS) that manages hardware and software of the client machines 102. The client devices 102 can run an operating system (OS) that manages hardware and software of the client devices 102. An application 180 can run on the client devices 102 (e.g., on the OS of the client devices). An application 180 can be any type of application including, for example, a web application, a desktop application, a browser application, a mobile device application (e.g., smart phone application, media player application, tablet device application, etc.) etc. Examples of a mobile device can include, and are not limited to, phones, tablet computers, media players, personal digital assistants, etc. The application 180 can issue data search queries to the application server 140.

The machines 115 can include an application server 140 and a context module 106. In one implementation the context module 106 is part of the application server 140. In another implementation, the context module 106 can be separate from the application server 140 and can be executed to interface with the application server 140. In one implementation, the application server 140 and context module 106 run on different machines. The machines 115 can host an application server 140 to provide web applications, mobile device applications, desktop applications, and data (e.g., content data) for the applications 180. Machines 115 may be rackmount servers, router computers, personal computers, laptop computers, tablet computers, desktop computers, media centers, or any combination of the above.

The context module 106 can add context to the content data in the data stores 112 by classifying the content data and/or adding semantics to the content data. The context module 106 can classify the content data by associating individual content data with one or more predefined topics. The topics can be user (e.g., system administrator) defined. The topics can be manufacturing related topics. Examples of topics can include, and are not limited to, product, equipment, part, process, problem, symptom, etc. The topics can include sub-topics. For example, the topic of equipment can include specific equipment as sub-topics. The predefined topics and sub-topics can be updated.

The context system 106 can add semantics to the content data by identifying relationships amongst the content data, creating connections between the related content data, and associating the individual content data and the relationships between the content data with possible search terms. The context system 106 may receive one or more search terms and can use the classifications of the content data and the semantics that were added to the content data to dynamically provide a graphical user interface (GUI) that includes the relevant search results from the content data based on the context (e.g., classification, semantics).

The application server 140 may receive data queries from the client machines 102. The context module 106 can use the context (e.g., classification, semantics) that was added to the content data in the data stores 112 to find content data that satisfies the data query. The context module 106 can create a results page 185 and/or provide data for a results page 185 which the application server 140 may serve to the client 102 making the request. In one implementation, the application 180 can render the results page 185 that includes the content data that satisfies the data query on the client machine 102. A data query may be, for example, based on search terms that describe, for example, and not limited to, product name, part number, equipment, problem, symptoms, etc.

In one embodiment, the application server 140 provides a search application for querying the content data. For example, the application 180 can be a search portal for users 101 (e.g., customer engineers, field engineers, product engineers, etc.) to search for information relating to products, parts, equipment, etc. for troubleshooting parts, equipment, material, etc. related to the manufacturing of a product. In one embodiment, an application 180 is provided by and maintained within a service provider environment and provides services relating to the content data. For example, a service provider may maintain application servers 140 to provide a search portal for troubleshooting issues that may be related to manufacturing a product.

A user 101, such as a field engineer, customer engineer, product engineer, etc., can use an application 180 (e.g., browser) to access content data via an application server 140 and the context module 106. The context module 106 can provide an initial application page (e.g., web page, mobile application page, etc.) to receive one or more keywords from a user 101 for a query. The context module 106 can provide a results page 185 (e.g., results web page, mobile application results page, etc.) of search results based on the keywords and the context added to the content data. The results page 185 can contain content data that is relevant to the keywords. The context system 106 can identify which content data is relevant to the keywords based on taxonomy, classification, tagging, and semantics already performed by and/or added by the context module 106 on the content data.

For example, the user 101 may wish to troubleshoot a particular manufacturing part and may request a search based on a part number for the manufacturing part. The context module 106 can automatically identify, via the application server 140, the content data that relates to the manufacturing part in a results page 185, which can be rendered by an application 180. The context module 106 can dynamically populate the results page 185 with the identified content data, such as, and not limited to, an image of the manufacturing part from one of the data stores 112, a Bill of Materials (BOM) relating to the manufacturing part from one of the data stores 112, a description of the manufacturing part from one of the data stores 112, and data describing the current inventory and average delivery time for the manufacturing part, etc. The results page 185 can also include documents obtained from one or more of the data stores 112, discussion threads from one or more of the data stores 112, etc. Implementations of a subset of content data that is in a results page based on the context added to the content data is described in greater detail below in conjunction with FIG. 3 and FIGS. 6-10.

A data store 112 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

Figure 2:
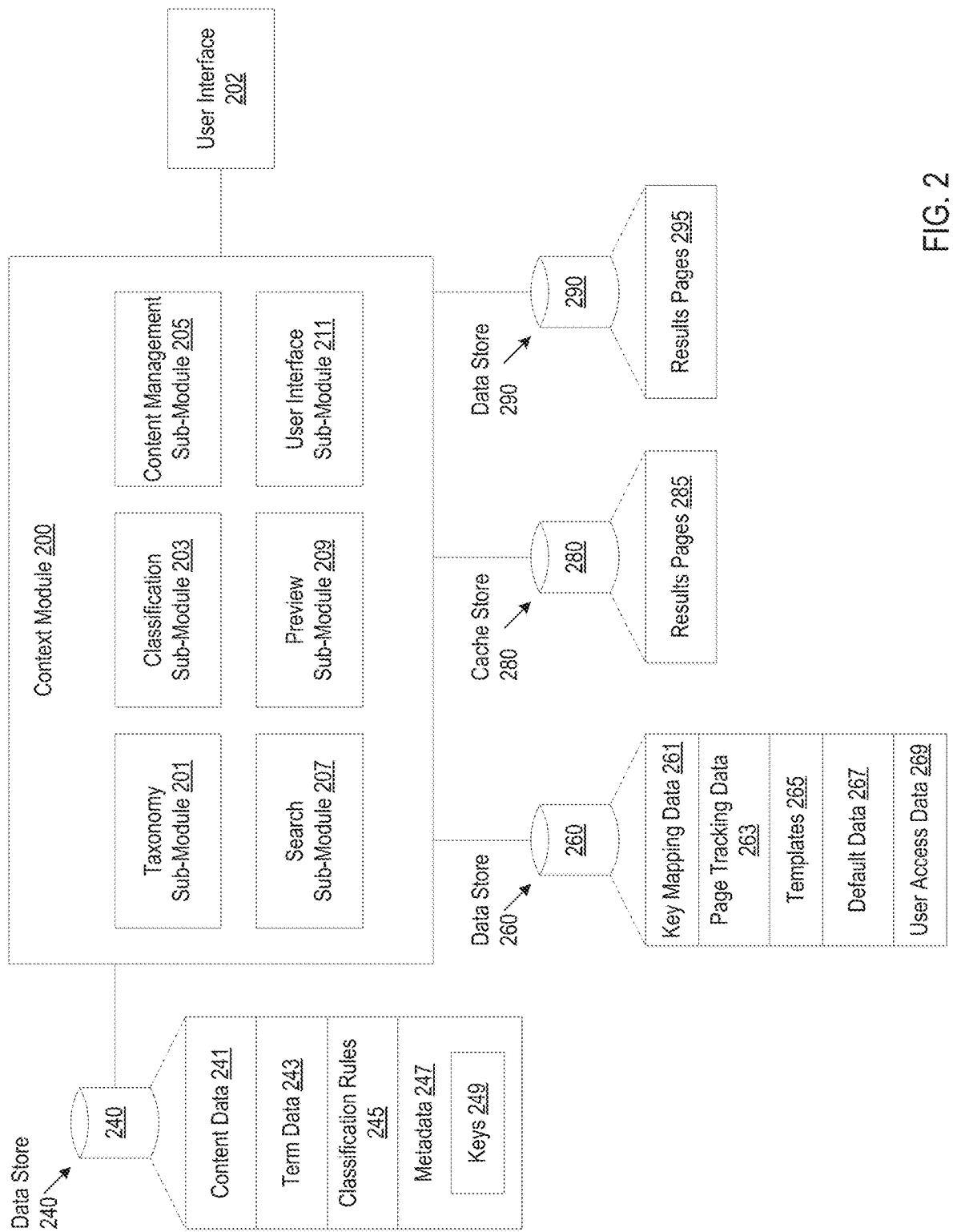
FIG. 2 is a block diagram of one implementation of a context module.

FIG. 2 is a block diagram of one embodiment of a context module 200. In one implementation, the context module 200 is the same as the context module 106 of FIG. 1. The context module 200 can include a taxonomy sub-module 201, a classification sub-module 203, a content management sub-module 205, a search sub-module 207, a preview sub-module 209, and a user interface (UI) sub-module 211.

The context module 200 can be coupled to one or more data stores 240 that store content data 241. Examples of content data 241 can include, and are not limited to, published content from a publishing system, corporate documents from a document management system, content from email systems, manufacturing documents (e.g., manufacturing specifications), design documents (e.g., part drawings, schematics), internal website content, content from file sharing repositories, content from image and/or video repositories, content from a parts management system, inventory system, ordering system, procedures, process data from production systems, user provided content (e.g., content from discussion forums, uploaded content), etc. The content data 241 can include structured content (e.g., database data) and unstructured content (e.g., documents, user-provided content in discussion threads, forums, feedback, etc.).

The context module 200 can include the taxonomy sub-module 201, classification sub-module 203, and content management sub-module 205 to pre-process the content data 241 in the one or more data stores 240. In one implementation, the taxonomy sub-module 201, classification sub-module 203, and content management sub-module 205 may be separate from the context module 200 and may be executed to interface with the context module 200. Pre-processing of the content data 241 can include routing the content data 241 to appropriate data stores 240, classifying and/or tagging the content data 241, publishing the content data 241, etc.

The taxonomy sub-module 201 can determine the subject for the individual content data 241 and determine relationships that are based on the topics (e.g., part, product, process, equipment) between the individual content data. The taxonomy sub-module 201 can create term data 243 that includes a list of terms to be used by the classification module 203 to classify the content data. The taxonomy sub-module 201 can receive user input and/or import terms from other systems (e.g., part number from a part management system) to create the term data 243. The term data 243 can be stored in the data store 240.

The classification sub-module 203 can use the term data 243 and classification rules 245 stored in the data store 240 to create metadata 247 for the content data 241. The metadata 247 can include keys 249 to be used to associate the content data 241 with search terms for a query. The classification rules 245 can be user defined rules. The classification module 203 can receive user input defining and/or changing the classifications rules 245. Upon applying new rules or changes to rules, the classification module 203 can validate the classification rules 245 by running through a corpus of content data 241 without affecting the metadata 247. Following verification, the changes can be accepted by a user (e.g., system administrator) and applied to the corpus in production.

The classification sub-module 203 can work with the content management module 205 and the search sub-module 207 to ensure that content data 241, which is not published or maintained by the content management sub-module 205, can be classified such that the search sub-module 207 can also provide a consistent set of metadata 247 and security across all sources of content data 241. For example, content that is stored in a database of parts or service records can be metatagged with the same tags as those in the content management repository without having to modify those systems to accept the metadata. The classification sub-module 203 can work with the content management sub-module 205 to ensure that when new content data 241, which is published via a process and workflow managed by the content management sub-module 205, are added to a publication repository, the new content data 241 can be secured and metatagged appropriately.

The classification sub-module 203 can use the metadata 247 to launch workflow processes. The classification sub-module 203 can also allow for workflows to be generated based on the specific rules (e.g., sensitive data rules) applied. For example, a field engineer uploads a document which contains a vague reference to "Customer XYZ" as the manufacturer of the CPU (central processing unit) on an imaging computer. The classification sub-module 203 could alert the field engineer that a sensitive data rule was potentially broken by the reference to "Customer XYZ" and launch a workflow to, for example, have someone else review the uploaded document, prevent the content from being uploaded and from being made available to users, sanitize the document, etc.

The classification sub-module 203 can generate a report and provide the report via user interface (UI) 202 generated by the user interface sub-module 211. The report can describe classification activities, classification rules analysis, etc.

The content management sub-module 205 can create and publish documents based on user input. The published documents can be stored as content data 241 in the data store 240. The published documents, can include, and are not limited to, word processing files, spreadsheets, presentation files, XML files, etc. The content management sub-module 205 can implement and manage workflows for the creation, review, approval, and publication processes to produce the published documents. The documents managed by the content management sub-module 205 can be stored with corresponding metadata 247 in the data store 240, which can be accessible by the classification sub-module 203 and the search sub-module 207.

The metadata 247 can be also be used by the search sub-module 207. The search sub-module 207 can search the content data 241 as well as data not already stored as part of the content data 241. The search sub-module 207 can create metadata 247 for any data being searched. The search sub-module 207 can use search logs to train and tune the search sub-module 207.

The user interface (UI) sub-module 211 can provide a user interface 202 to present one or more results pages 285,290 to users. The UI 202 can be a graphical user interface. The UI sub-module 211 can access the term data 243, for example, generated by the taxonomy sub-module 201, the metadata 247, for example, generated by the classification sub-module 203 and/or search sub-module 207, metadata from the source repository (e.g., data store 240) (where applicable), and the content data 241 to generate a results page 285,290 and populate the results page 285,290 with relevant data.

The UI sub-module 211 can present a query page (e.g., query web page, query mobile application page) to receive user input, for example, of one or more search terms for a query. The query can be a product manufacturing related query. For example, the search terms may be a manufacturing part number, "Part #123-45-6789" of a part that is used to manufacture a product. The UI sub-module 211 can use key mapping data 261 that is stored in a data store 260 to identify a key 249 that corresponds to the search terms. The key mapping data 261 can be a mapping of keys to various search terms. For example, the search terms may be "Part #123-45-6789," "Part No. 123456789," or "Part 12-3456-789" which may be mapped to the same key 249 "Part-123456789" in the key mapping data 261. The key mapping data 261 can be created by the classification sub-module 203. The classification sub-module 203 can specify which keys 249 map to which search terms based on user (e.g., system administrator) input, classifier techniques, etc.

The search sub-module 211 can use the key 249 to determine whether there is a results page 285,295 that already exists and corresponds to the key 249. A cache store 280 can store previously created results pages 285. A persistent data store 290 can also store previously created results pages 295. The UI sub-module 211 can access page tracking data 263 that is stored in a data store 260 to determine whether there is a results page 285,295 that corresponds to the key 249 in the cache store 280 and/or data store 290. The page tracking data 263 can be a list of page identifies and corresponding keys 249 and page locations. For example, the page tracking data 263 may be a list of part results pages, product results pages, and equipment results pages that were already created by the UI sub-module 211. The UI sub-module 211 can update the page tracking data 263 when results pages 285,295 are created and stored.

If there is a results page 285,295 that already exists and corresponds to the key 249, the UI sub-module 211 can present the results page 285,295 to a user via the UI 202. If there is not a results page 285,295 that already exists, the UI module 211 can create a results page 285,295 for a key 249 and provide the results page 285,295 to a user via the UI 202. The UI sub-module 211 can use a results page template 265 that is stored in the data store 260 to create a results page for a key. The results page templates 265 can be predefined user-defined templates. The key mapping data 261 can map the key 249 to a topic type (e.g., product, part, equipment, process, etc.). For example, the key 249 may be "Part-123456789" and the topic type may be "Part". The templates 265 can be associated with a topic type and the UI sub-module 211 can identify which template 265 to use based on the key and topic type. For example, the UI sub-module 211 may use a "Part" template for the key 249 "Part-123456789."

The UI sub-module 211 can populate a template 265 with default data 267 that is associated with the key 249 and is stored in the data store 260. The default data 265 can include, for example, and not limited to, images, part number, part name, part description. The default data 265 can be user provided data. The default data 265 can be pointers to content data 241 for, for example, images, part number, part name, part description, etc. that correspond to the key 249.

The UI sub-module 211 can dynamically populate a template 265 with content data 241 that is relevant to the key 249. The search module 207 can identify which content data 241 is associated with the key 249 (e.g., Part-123456789) by examining the metadata 247 for the content data 241, and the UI module 211 can populate the template 265 with the relevant content data 241. The template 265 populated with default data 267 and content data 241 creates a results page 285,295 for the key 249. The UI sub-module 211 can store the created results page 285,295 in a cache store 280 and/or a persistent data store 290. The results page 285,295 can include relevant unstructured data, such as document results based on the search module 207. The results page 285,295 can include relevant structured data, such as data from a database in another system. For example, the results page 285,295 can include structured data from a database in an Order Management System, such as the current inventory status, the stocking levels, average delivery time, etc.

In one implementation, instead of having to present an entire file storing content data via the UI 202, the preview sub-module 209 can create a preview user interface (e.g., page, pop-up window, sliding panel, etc.) that includes the most relevant sections of a file (e.g., document) storing content data 241. The preview sub-module 209 can determine the relevant sections based on the term data 243. The UI sub-module 211 can present the preview UI via the UI 202. A preview UI can help with client systems that may have lower bandwidth.

The results page 285,295 can be edited by a user. The UI module 211 can receive user input to change the content in the results page 285,295. For example, a user may upload an image of a defective Part-123456789, provide a rating, feedback, and/or comments about Part-123456789, add a comment in a forum for Part-123456789, add a comment in a discussion thread about Part-123456789, etc. The UI module 211 can store the user-provided content as part of the content data 241 in the data store 240. The classification module 203 can classify and/or tag the user-provided content.

The UI module 211 can access user access data 269 that is stored in a data store to control which users have access to the results pages 285,295 and the type of access a user may have.

The data store 240,260,290 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

Figure 3:
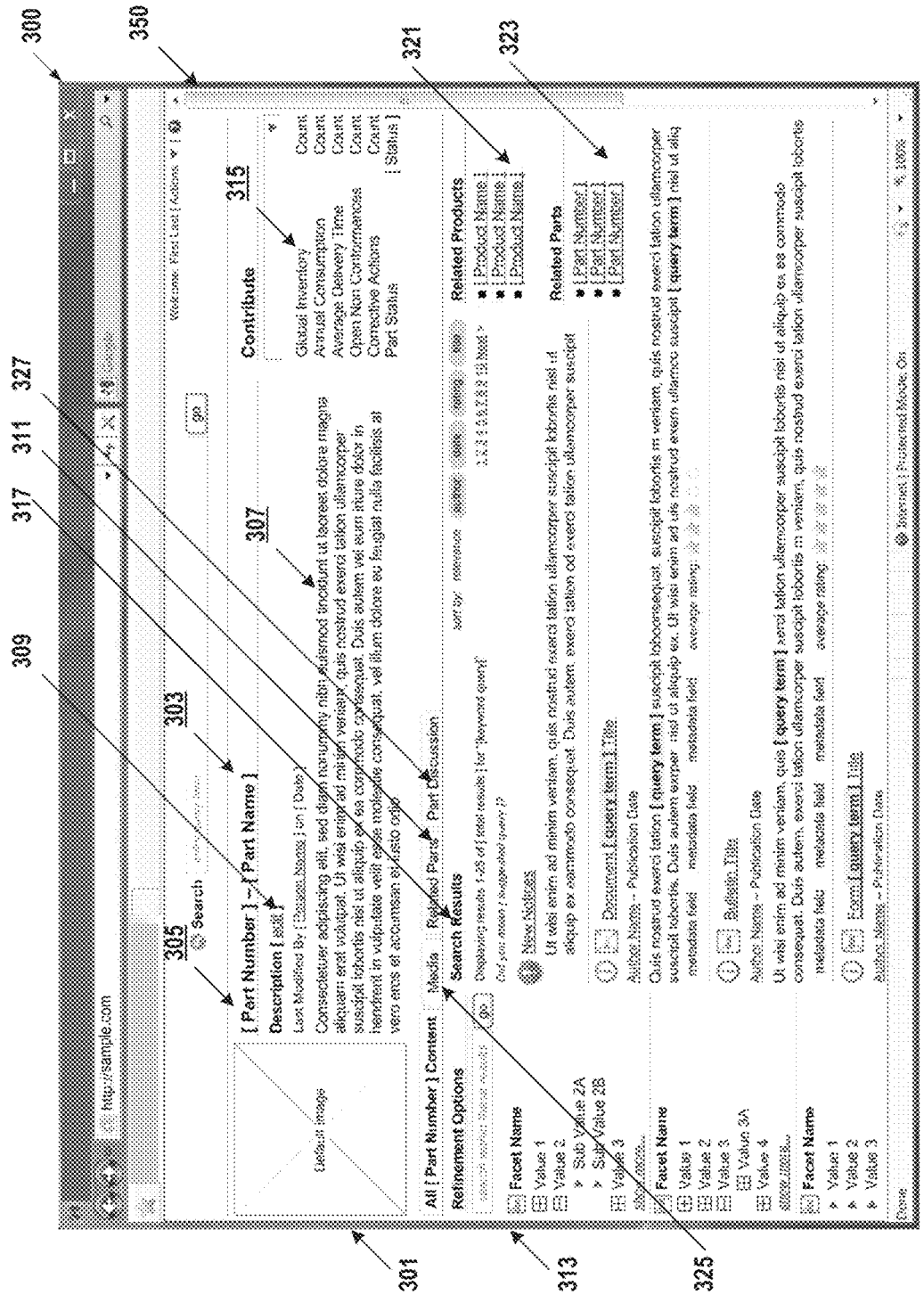
FIG. 3 illustrates an example user interface (UI) for providing dynamic equipment related content via an example 'Parts View' results page, according to some implementations.

FIG. 3 illustrates an example user interface (UI) 300 for providing dynamic content in context via an example "Parts View" results page 350, according to some embodiments. One implementation of an example "Product View" results page is described in greater detail below in conjunction with FIG. 6. One implementation of an example "Equipment View" results page is described in greater detail below in conjunction with FIG. 7.

The results page 350 can be a web page. For any topic (e.g., part, product, equipment, process, etc.), the results page can include default data that corresponds to a key (e.g., a particular part number). Examples, of default data can include, for example, an image 301, an identifier 303 (e.g., part name, product identifier, equipment identifier, process name), a number 305, if applicable, such as a part number, and a description 307. For any topic, the results page can include unstructured data. For example, the results page 350 can include documents in a first tab (e.g., search results 317) in the results page 350 and filtering facets (e.g., facet 313), according to some implementation. Filtering facets allow exploration of content data by applying multiple filters.

The results page 350 can dynamically include links to the related products 321 and related parts 323 that are most relevant to the particular part based on the search results 317. The links for the related products 321 and the related parts 323 are dynamically generated using the search results 317, which are in response to the query terms. The links can include a predefined number of links that represent the most relevant related products and related parts based on the search results 317.

Figure 9:
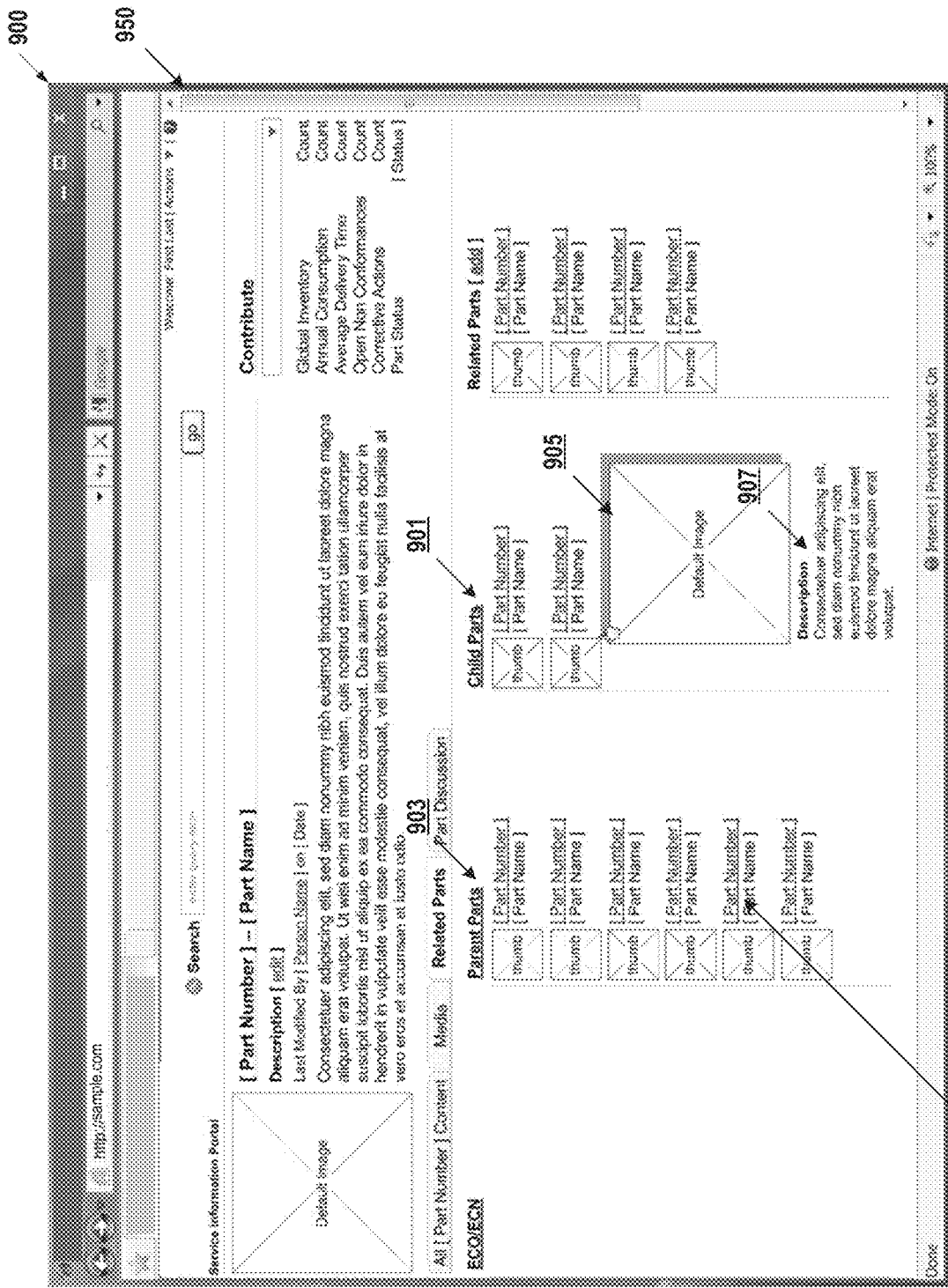
FIG. 9 illustrates an example UI for providing dynamic equipment related parts content in context via an example results page, according to some embodiments.

The results page 350 can include a UI element 311 (e.g., tab) to receive user input (e.g., mouse click) to present data describing related parts, which can be parts that reference the particular part number, for example, by a notification (e.g., safety notification, customer engineering news, bulletin, etc.). FIG. 9 illustrates an exemplary user interface (UI) 900 for providing dynamic related parts content in context via an exemplary results page 950, according to some embodiments. The data describing the related parts can include child parts data 901 that provide a list of child part numbers and additional data (e.g., image 905, description 907) of the corresponding child part. The data describing the related parts can include parent parts data 903 that provide a list of parent part numbers and additional data of the corresponding patent part. The results page 950 can include a UI element 925 to receive user input to present a Parts View page for a selected part in the related parts data.

Returning to FIG. 3, the results page 350 can include information 315 about the parts from a data source system, such as, an order management system. The information 315 can include, for example, global inventory, consumption, quality statistics and change order information. The results page 350 can include UI elements for each search result to receive user input of feedback, to receive user input to contact a person (e.g., owner of a document), to receive user input of a rating, to receive user input of a request for a change, to receive user input to create a new document (e.g., procedure, reference document) related to this part.

The content of the results page 350 can be changed, for example, based on user input. The results page 350 can include a user interface element 309 to receive user input to change the content.

The image 301 may be an image that has been tagged as the best representation associated with the particular part number. The best representation can be tagged based on user (e.g., system administrator) input. If no part image exists then, a "no image available" message can be included in the results page 350. The results page 350 can present additional images that are associated with the part number. The results page 350 can receive user input indicating a selection of one of the images as the best representation for the part number.

A "Parts View" results page can be associated with a specific part number and optionally a revision number for the part. The results page 350 can display the information which relates to the particular part number. The results page 350 can include data describing other versions of the part number, if applicable. The results page 350 can display each revision as a facet (e.g., facet 313) to further refine the search.

Figure 8:
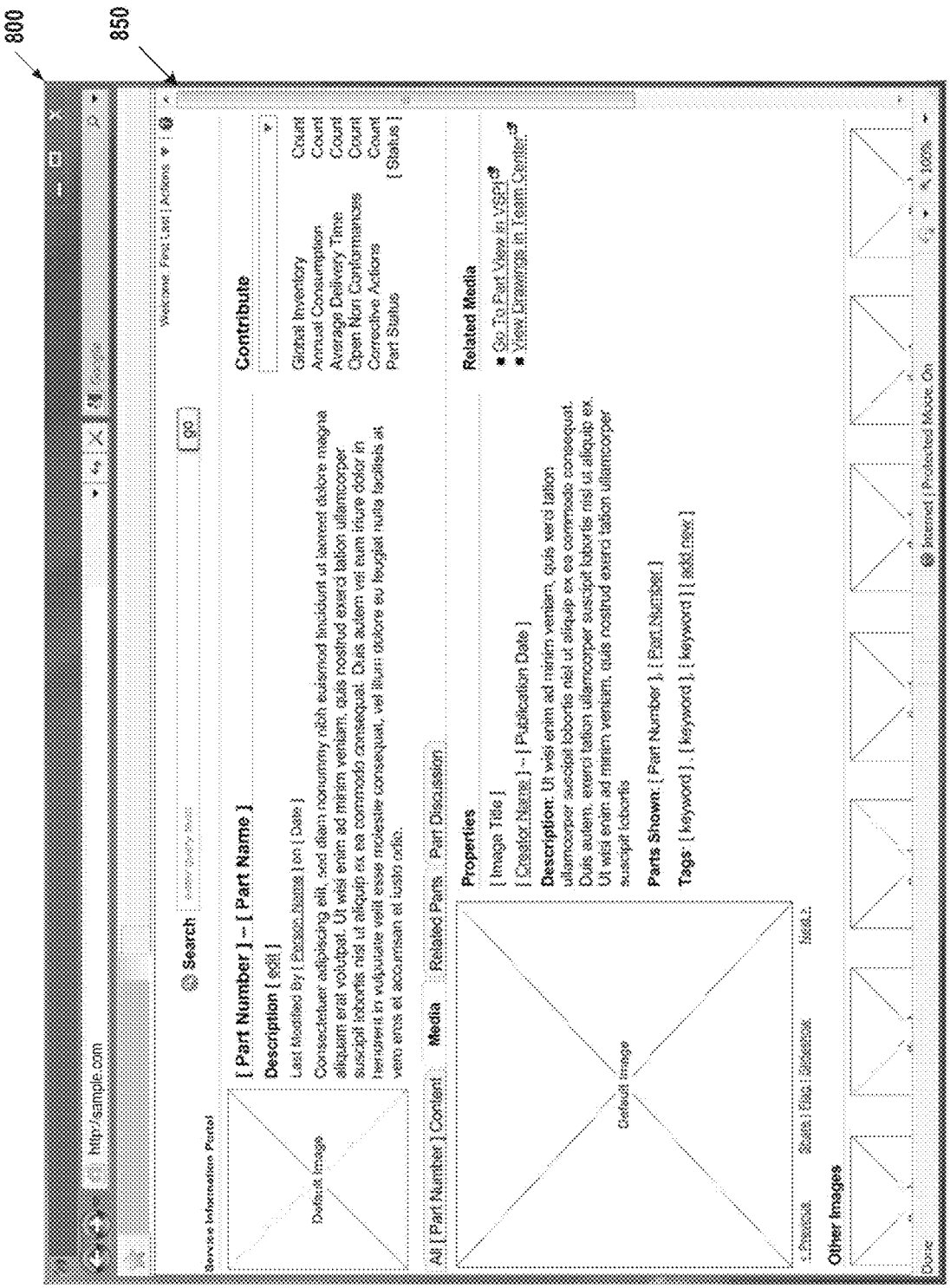
FIG. 8 illustrates an example UI for providing dynamic equipment related media content in context via an example results page, according to some implementations.

The results page 350 can include a UI element 325 (e.g., tab) to receive user input (e.g., mouse click) to present media data associated with the part number. FIG. 8 illustrates an exemplary user interface (UI) 800 for providing dynamic media content in context via an exemplary results page 850, according to some embodiments. The media can include video, images, audio, etc.

Returning to FIG. 3, the results page 350 can include default results that include sections, such as, and not limited to, 'What's New', 'Notices', and 'Most Viewed.' The 'What's New' section can display the most recently updated procedures, notices and other document types. The 'Notices' section can display all 'Notice' document types, such as 'Product Safety Notices', 'Bulletins', 'Customer Engineer News', etc., which apply to the part. The 'Most Viewed' section can display all document types which apply to the part by the number of recent viewings.

Figure 10:
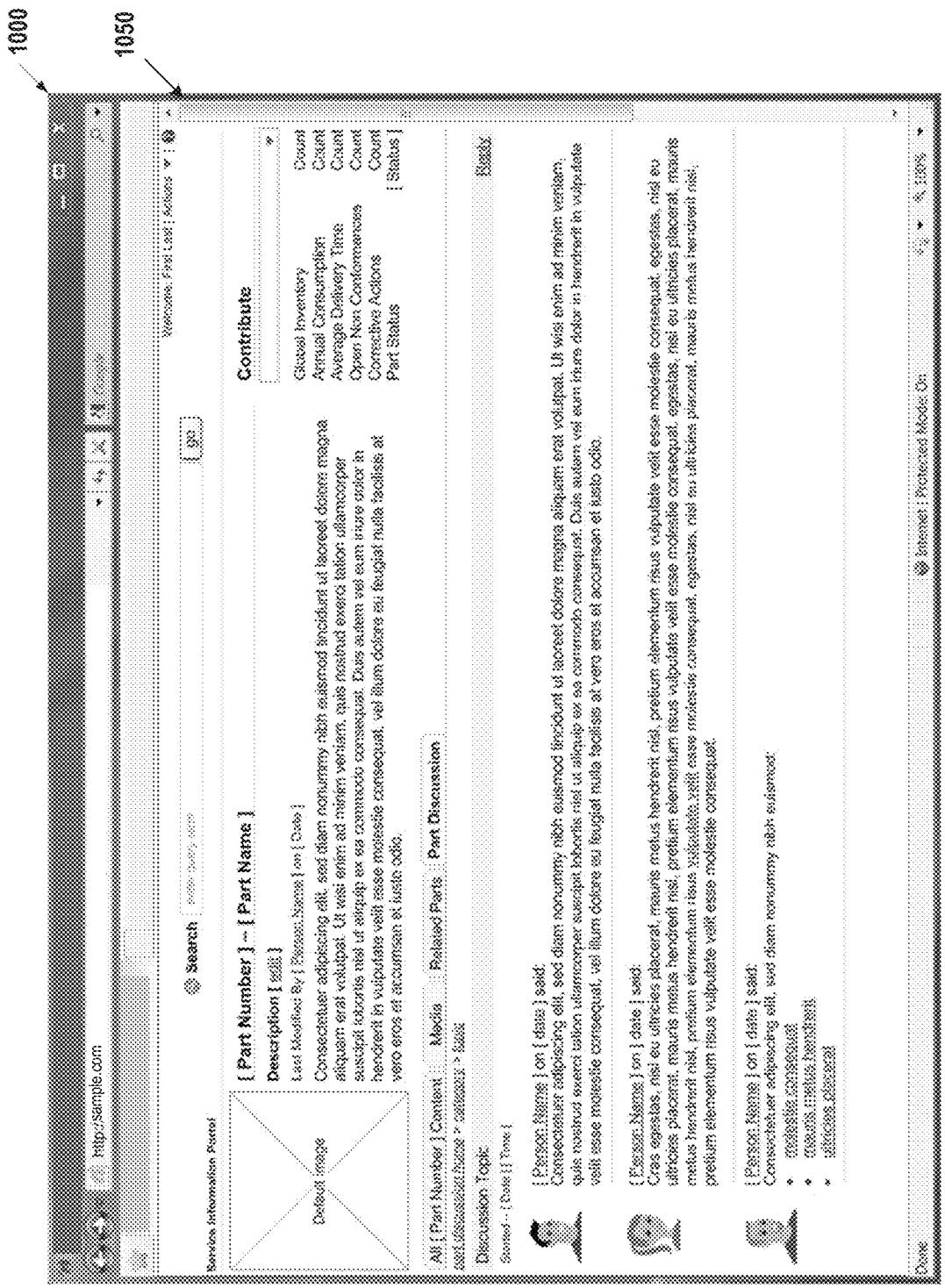
FIG. 10 illustrates an example UI for providing dynamic equipment related user-provided content in context via an example results page, according to some implementations.

The results page 350 can include a UI element 327 (e.g., tab) to receive user input (e.g., mouse click) to present user-provided content (e.g., user discussion, forum, threads, feedback, ratings, comments, etc). FIG. 10 illustrates an exemplary user interface (UI) 1000 for providing dynamic user-provided content in context via an exemplary results page 1050, according to some embodiments.

Figure 4:
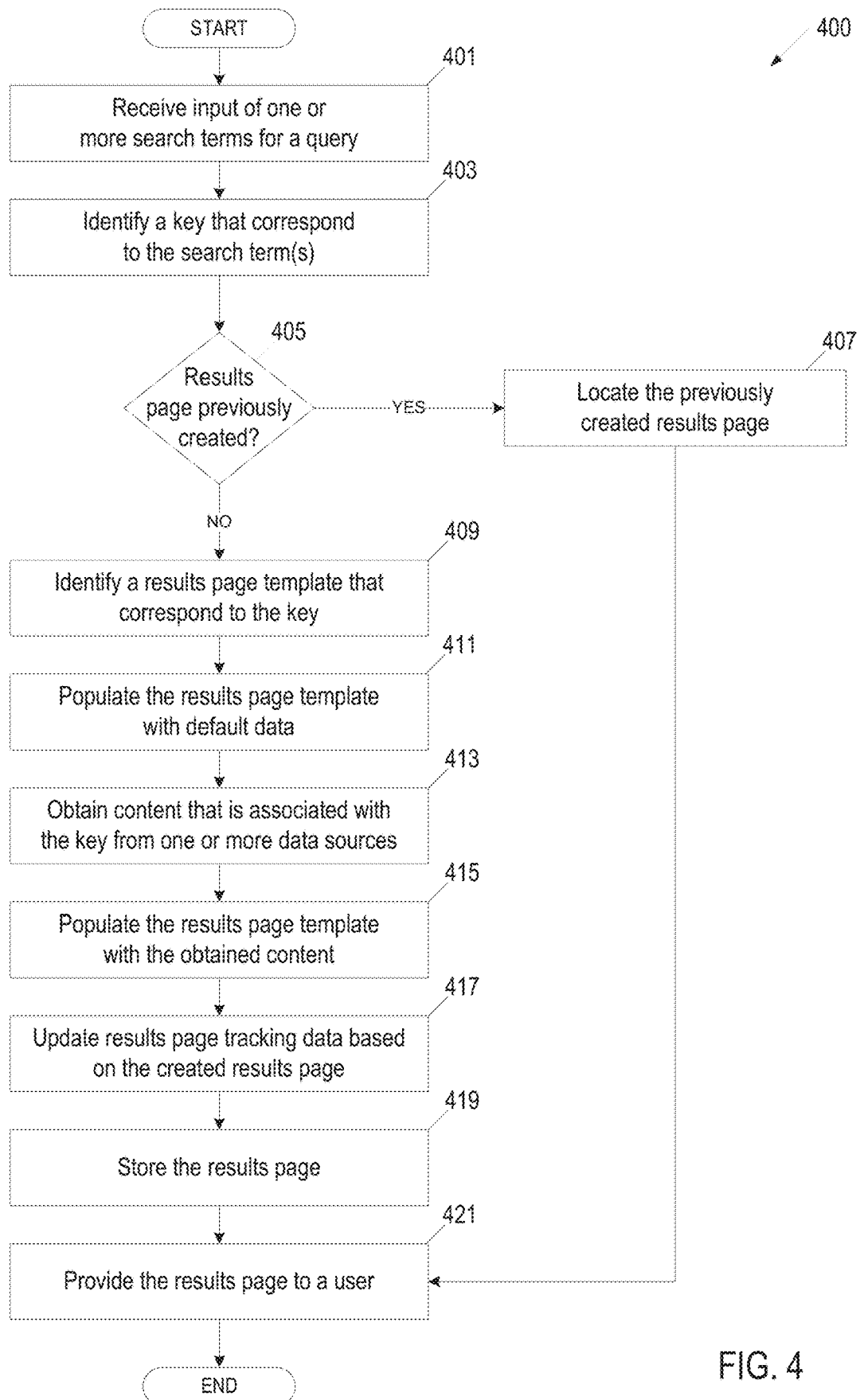
FIG. 4 is a flow diagram of an implementation of a method for providing dynamic equipment related content in context of a particular equipment related component.

FIG. 4 is a flow diagram of an embodiment of a method 400 for providing dynamic manufacturing-related content with relationship context. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the context module 106 hosted by a machine 115 of FIG. 1.

At block 401, processing logic receives input of a search term for a query. The query may be, for example, and not limited to, a manufacturing related query, an engineering design related query, an equipment (e.g., military equipment, manufacturing equipment) related query, a service related query, etc. For example, a manufacturing related query may be a query for information for a product being manufactured, a manufacturing part, manufacturing process, manufacturing equipment, engineering design related to the manufacturing, etc. The input can be user (e.g., customer engineer, field engineer, technician, etc.) input. Examples of input can include, and are not limited to, one or more keywords, a part number, a symptom of failed equipment, product name, process name, etc. For example, the input may be "Part #123-5".

At block 403, processing logic identifies a key that corresponds to the search term. Processing logic can access key mapping data that is stored in a data store that is coupled to the context module to identify the key that corresponds to the input. The key mapping data may map keys to various input. For example, the input may be "Part #123-5," which can be mapped to the key "Part1235" in the key mapping data. The key can be used to create the results for the query.

At block 405, processing logic determines whether there is a results page that is already created for the key. Processing logic can access page tracking data that is stored in the data store to determine whether there is a results page that already exists for the key. The page tracking data can be a list of page identifies, corresponding keys, and page locations. For example, the page tracking data is a list of "Part" results pages, "Product" results pages, and "Equipment" results pages that were previously created for corresponding keys.

If there is a previously created results page for the key, processing logic can locate the existing results page for the key based on the location in the page tracking data at block 407. The existing results page may be in a cache store that is coupled to the context module. The results page may be in persistent data store that is coupled to the context module.

If there is not an existing results page for the key (block 405), processing logic can identify a results page template that corresponds to the key at block 409. The key can be associated with a topic (e.g., product, part, equipment, process, etc.). For example, the key "Part1235" may be associated with the topic "Part". The templates can be associated with a topic. The processing logic can identify which results page template has the same topic as the key. For example, processing logic may use a "Part" template for the key "Part1235."

At block 411, processing logic populates the results page template with default data that corresponds to the key. The default data can be associated with one or more topics. The processing logic can identify which default data has the same topic as the key. The default data can be stored in the data store. The default data can include, for example, and not limited to, one or more images, part number, part name, part description.

At block 413, processing logic identifies content that corresponds to the key from the one or more data sources. The content can have metadata, which can include a key, which matches the key that corresponds to the search terms. For example, the search term "Part #123-5" may be mapped to the key "Part1235". Processing logic may search the metadata for the individual content data and may locate keys in the metadata for some of the individual content data that match "Part1235". For example, an image of the Part No. 1235 in the content data may have the key "Part1235" in its metadata, a description of Part No. 1235 in the content data may have the key "Part1235" in its metadata, inventory data for Part No. 1235 in the content data may have the key "Part1235" in its metadata, ordering information for Part No. 1235 in the content data may have the key "Part1235" in its metadata, average delivery time for Part No. 1235 in the content data may have the key "Part1235" in its metadata, a bill of materials for Part No. 1235 in the content data may have the key "Part1235" in its metadata, user feedback for Part No. 1235 in the content data may have the key "Part1235" in its metadata, discussion threads discussing Part No. 1235 in the content data may have the key "Part1235" in its metadata, Notices for Part No. 1235 in the content data may have the key "Part1235" in its metadata, etc.

At block 413, processing logic dynamically obtains the content that is associated with the key from the one or more data sources and populates the results page template with the content from the data sources at block 415. At block 417, processing logic stores the created results page for the key and updates the tracking data based on the created results page at block 419. The results page can be stored, for example, in a cache. At block 421, processing logic provides the results page for the key via a UI to the user.

Figure 5:
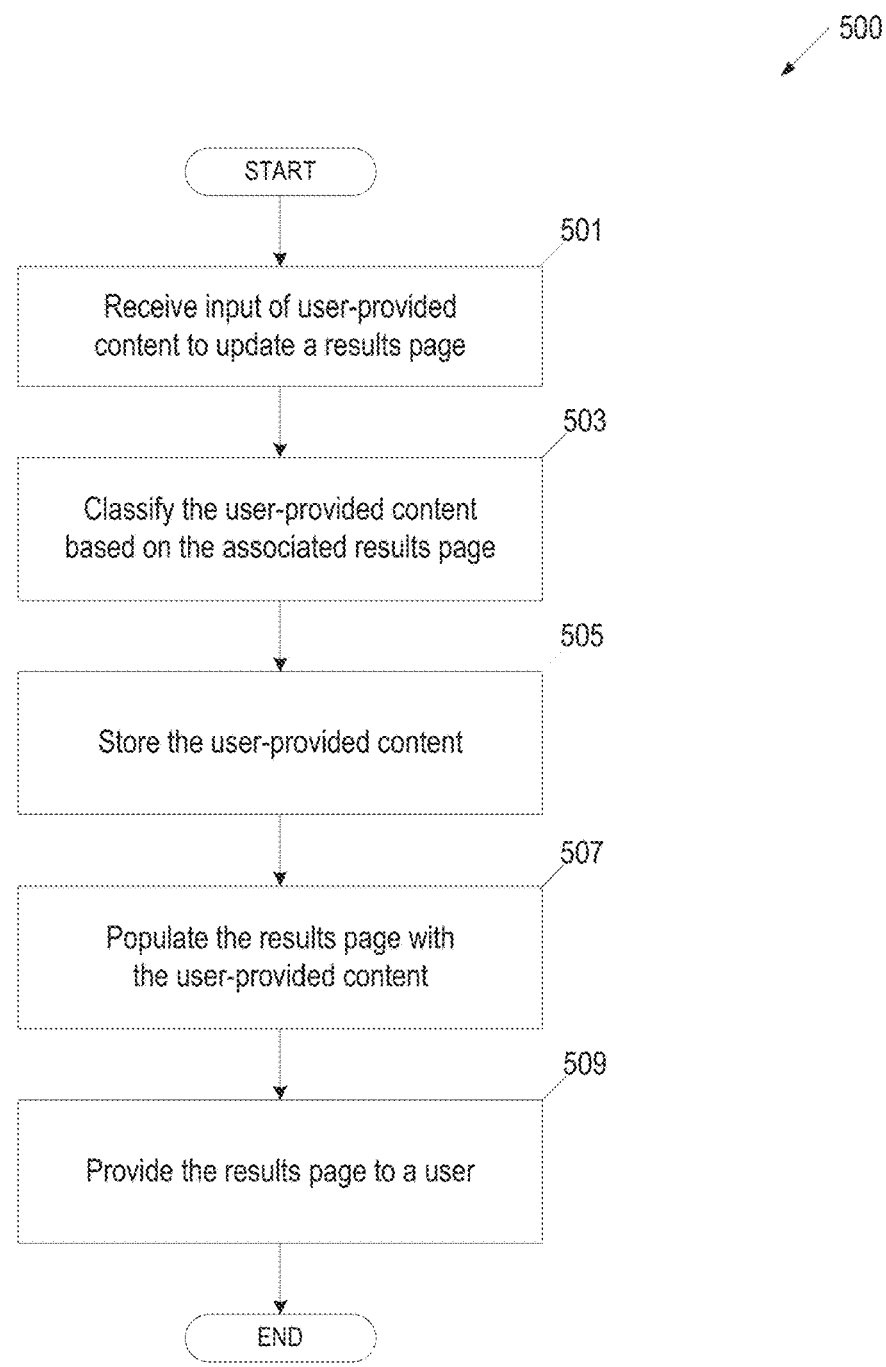
FIG. 5 is a flow diagram of an implementation of a method for providing collaborative equipment related content in context of a particular equipment related component.

FIG. 5 is a flow diagram of an implementation of a method for providing collaborative content in context of particular equipment. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the context module 106 hosted by a machine 115 of FIG. 1.

At block 501, processing logic receives user input of user-provided content to update a results page. Examples of user-provided content can include, and are not limited to, documents, images, videos, audio, forum contributions, ratings, feedback, comments, thread discussion contributions, etc. For example, the results page may be a 'Part' results page and processing logic may receive input of an image for the part, such as an image of a defective part. In another example, the results page may be a 'Part' results page and processing logic may receive input of a video of how to install the part. In another example, an onsite customer engineer may be working with problematic manufacturing equipment to address a problem, troubleshoot the equipment to gather data, and determine some corrective action to resolve the problem. The customer engineer may wish to share the information (e.g., symptoms, corrective action, etc.) relating to this particular issue with other customer engineers world-wide. Processing logic can receive the user-provided content (e.g., symptoms, corrective action, etc.) uploaded by the customer engineer.

At block 503, processing logic classifies (e.g., tags) the content based on the results page. For example, processing logic tags the image with the part number that is associated with the particular 'Part' results page. The content is classified to become searchable by the context module. At block 505, processing logic stores the user-provided content in a data store that is coupled to the context module. At block 507, processing logic populates the results page with the user-provided content and provides the results page to a user at block 509.

Figure 6:
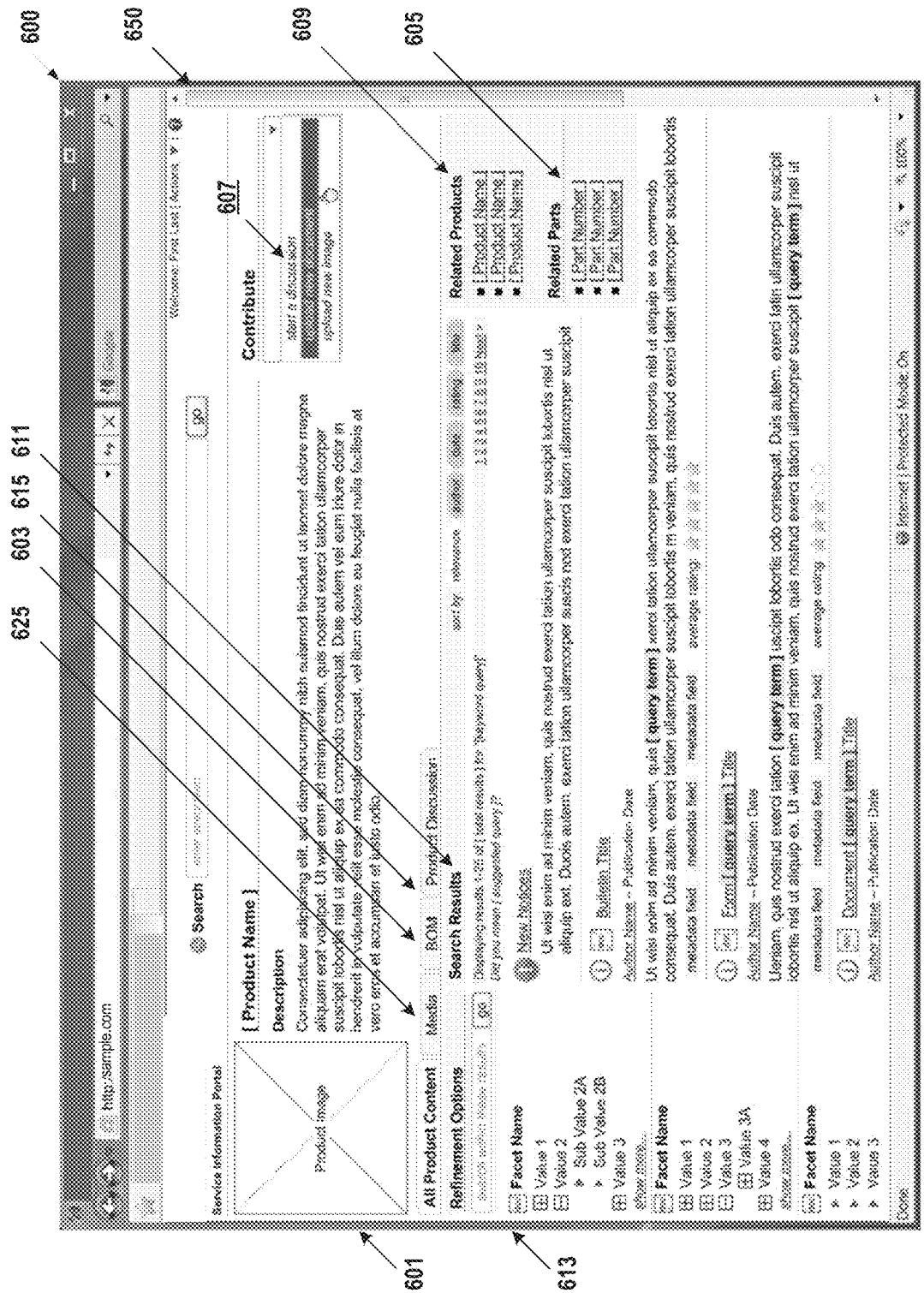
FIG. 6 illustrates an example UI for providing dynamic equipment related content in context via an example 'Product View' results page, according to some implementations.

FIG. 6 illustrates an exemplary user interface (UI) 600 for providing dynamic content in context via a results page 650, according to some embodiments. Results page 650 is an exemplary Product View results page, according to some embodiments. A "Product View" results page refers to the class of goods sold, according to various implementations. An "Equipment View" results page, which is described in greater detail below in conjunction with FIG. 7, refers to a specific instance of a good, according to various implementations. For example, a "Product" may be a particular make and model of a car. "Equipment View" may be for an instance of the particular make and model of the car. The instance can be different than other instances, for example, by identifier (e.g., VIN Number) owner, features, etc. A 'Product view' results page can be associated with a product, based on for example, a predefined product identifier. The results page 650 can display the information which relates to the particular product identifier.

The image 601 may be an image that has been tagged as the best representation associated with the particular product identifier. If no product image exists then, a 'No Image Available' message can be included in the results page 650. The results page 650 can present additional images that are associated with the product identifier. The results page 650 can receive user input indicating a selection of one of the images as the best representation for the product identifier.

The results page 650 can dynamically include links to the related products 609 and related parts 605 that are most relevant to the particular product identifier based on the search results 611. The links for the related products 609 and the related parts 605 are dynamically generated by the search results 611, which are in response to the query terms. The links can include a predefined number of links that represent the most relevant related products and related parts based on the search results 611.

The results page 650 can include a UI element 625 (e.g., tab) to receive user input (e.g., mouse click) to present media data associated with the product identifier. The results page 650 can include data describing product options, such as sub-assemblies, chambers, etc., as facets 613 to further refine the search. Other examples of facets 613 to further refine the search can include information types, such as Procedures, Notices, Manuals, etc. The results page 650 can include a UI element 603 (e.g., tab) to receive user input (e.g., mouse click) to present bill of materials (BOM) data associated with the product identifier. The results page 650 can include a UI element 615 (e.g., tab) to receive user input (e.g., mouse click) to present user-provided content (e.g., user discussion, forum, threads, feedback, ratings, comments, etc) for the product identifier.

The results page 650 can include default results that include sections, such as, and not limited to, 'What's New', Notices, and 'Most Viewed.' The 'What's New' section can display the most recently updated procedures, notices and other document types. The Notices section can displays all Notice document types, such as Product Safety Notices, bulletins, customer engineer news, etc., which apply to the product identifier. The Most Viewed section can display all document types which apply to the product identifier by the number of recent viewings.

The results page 650 can include UI element 607 (e.g., drop down menu) to receive user input of user-provided content (e.g., discussion content, new document, new image) about the product. The results page 650 can include UI elements for each search result to receive user input of feedback, to receive user input to contact a person (e.g., owner of a document), to receive user input of a rating, to receive user input of a request for a change, to receive user input to create a new document (e.g., procedure, reference document) related to this product identifier, which can start a publishing workflow depending on the contributor's role.

Figure 7:
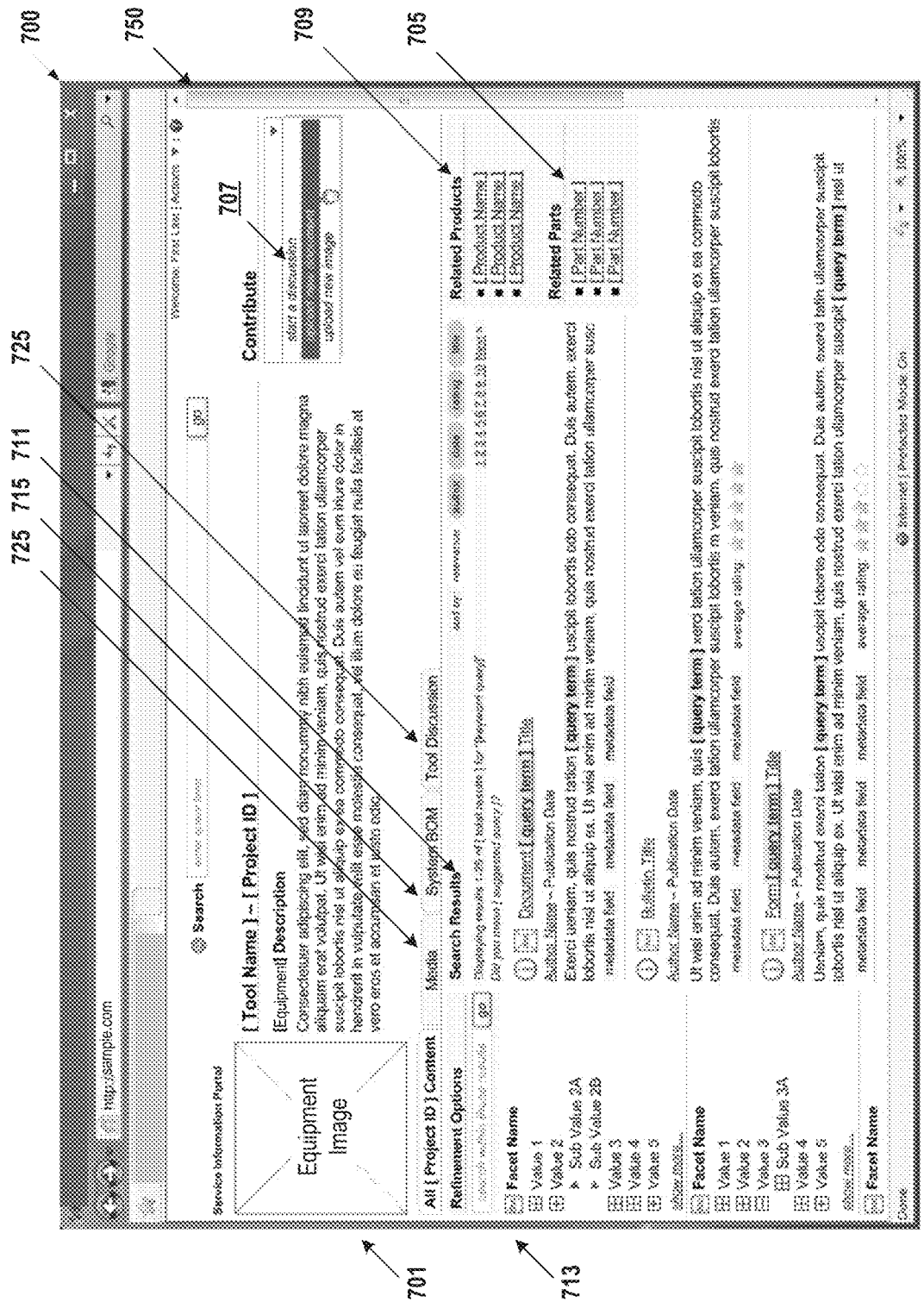
FIG. 7 illustrates an example UI for providing dynamic equipment related content in context via an example 'Equipment View' results page, according to some implementations.

FIG. 7 illustrates an exemplary user interface (UI) 700 for providing dynamic content in context via an exemplary 'Equipment View' results page 750, according to some embodiments. An 'Equipment View' results page can be associated with a particular equipment identifier. An 'Equipment View' results page can be associated with actual equipment that resides in the field. An "Equipment View" results page refers to a specific instance of a good, according to various implementations. For example, a "Product" may be a particular make and model of a car. "Equipment View" may be for an instance of the particular make and model of the car. The instance can be different than other instances, for example, by identifier (e.g., VIN Number) owner, features, etc. The results page 750 can display the information which relates to the particular equipment identifier (e.g., VIN).

The image 701 may be an image that has been tagged as the best representation associated with the particular equipment identifier. If no equipment image exists then, a no image available message can be included in the results page 750. The results page 750 can present additional images that are associated with the equipment identifier. The results page 750 can receive user input indicating a selection of one of the images as the best representation for the equipment identifier.

The results page 750 can include one or more filtering facets 713, for example, equipment components, such as chambers and sub-assemblies, to further refine the search. The results page 750 can include one or more filtering facets 713, based on information type, such as Procedures, Notices, Manuals, etc., to further refine the search. The results page 750 can include site specific procedures related to the equipment identifier.

The results page 750 can dynamically include links to the related products 709 and related parts 705 that are most relevant to the particular equipment identifier based on the search results 711. The links for the related products 709 and the related parts 705 are dynamically generated by the search results 711, which are in response to the query terms. The links can include a predefined number of links that represent the most frequently related products and related parts in the search results 711.

The results page 750 can include a UI element 725 (e.g., tab) to receive user input (e.g., mouse click) to present media data associated with the equipment identifier. The results page 750 can include a UI element 715 (e.g., tab) to receive user input (e.g., mouse click) to present bill of materials (BOM) data associated with the equipment identifier. The results page 750 can include a UI element 725 (e.g., tab) to receive user input (e.g., mouse click) to present user-provided content (e.g., user discussion, forum, threads, feedback, ratings, comments, etc) for the equipment identifier.

The results page 750 can include default results that include sections, such as, and not limited to, 'What's New', Notices, and 'Most Viewed.' The 'What's New' section can display the most recently updated procedures, notices and other document types. The Notices section can displays all Notice document types, such as Product Safety Notices, bulletins, customer engineer news, etc., which apply to the equipment identifier. The Most Viewed section can display all document types which apply to the equipment identifier by the number of recent viewings.

The results page 750 can include UI element 707 (e.g., drop down menu) to receive user input of user-provided content (e.g., discussion content, new document, new image) about the equipment. The results page 750 can include UI elements for each search result to receive user input of feedback, to receive user input to contact a person (e.g., owner of a document), to receive user input of a rating, to receive user input of a request for a change, to receive user input to create a new document (e.g., procedure, reference document) related to this equipment identifier, which can start a publishing workflow depending on the contributor's role.

Figure 11:
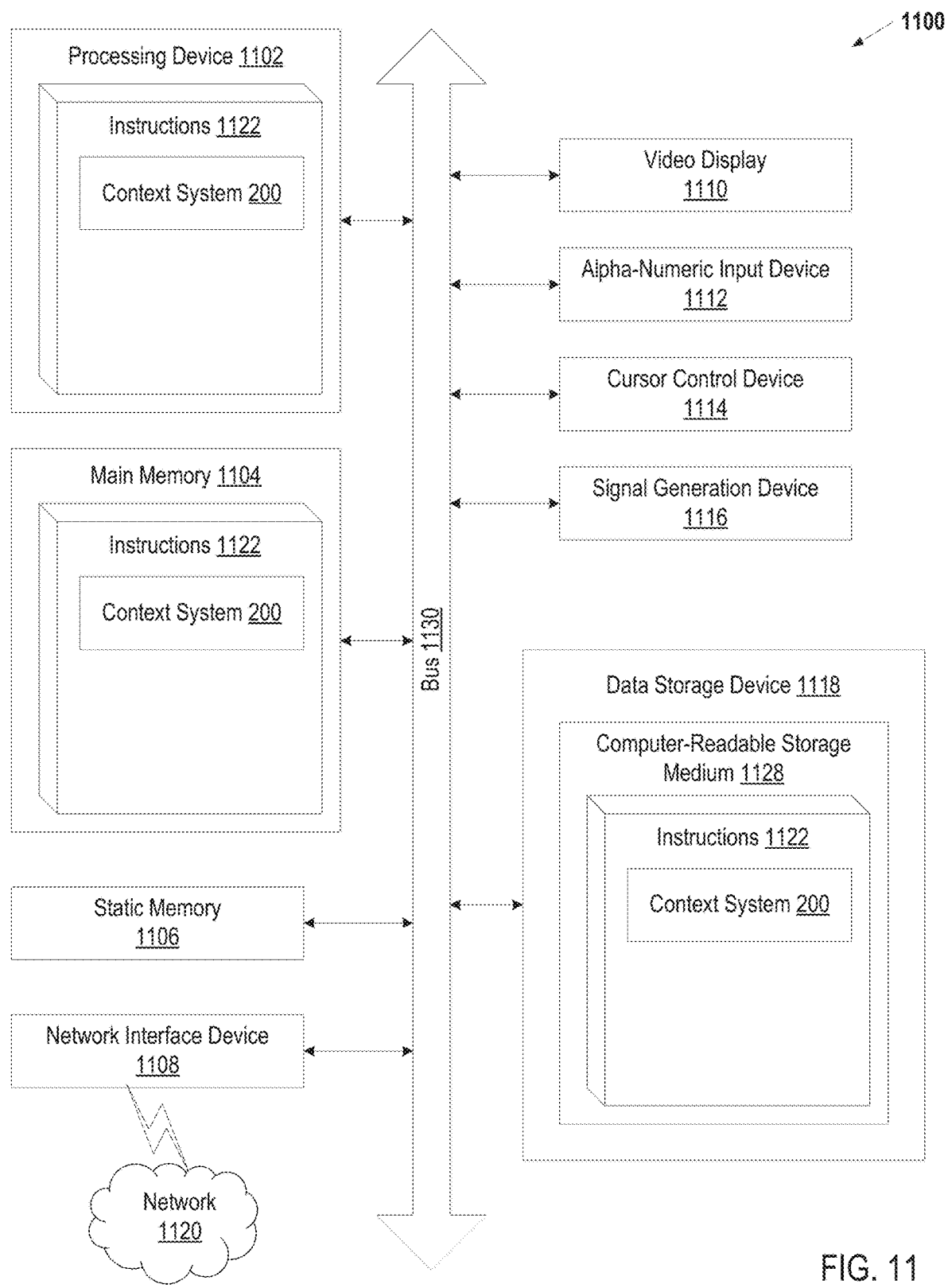
FIG. 11 illustrates an example computer system.

FIG. 11 illustrates a diagram of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM), double data rate (DDR SDRAM), or DRAM (RDRAM), etc.), a static memory 1106 (e.g., flash memory, static random access memory (SRAM), etc.), and a data storage device 1118, which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable storage medium 1128 on which is stored one or more sets of instructions 1122 (e.g., software) embodying any one or more of the methodologies or functions described herein. The instructions 1122 may also reside, completely or at least partially, within the main memory 1104 and/or within the processor 1102 during execution thereof by the computer system 1100, the main memory 1104 and the processor 1102 also constituting computer-readable storage media. The instructions 1122 may further be transmitted or received over a network 1120 via the network interface device 1108.

In one embodiment, the instructions 1122 include instructions for a context module (e.g., context module 200 of FIG. 2) and/or a software library containing methods that call a context system. While the computer-readable storage medium 1128 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "identifying", "obtaining," "populating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
receiving first input of a search term for a query, wherein the search term is related to equipment;
identifying a key mapped to a first set of search terms comprising the search term, wherein the key corre- sponds to a first topic, and wherein each of a plurality of sets of default data corresponds to a respective topic;

responsive to determining that a results page corresponding to the key was not stored, retrieving, from one or more data stores, a results page template and default data that correspond to the key, wherein the retrieving of the default data comprises determining that the default data corresponds to the first topic, and wherein the plurality of sets of default data comprise the default data;

obtaining structured data and unstructured data that are associated with the equipment, wherein the structured data is obtained from a data source storing the structured data, wherein the unstructured data is obtained from a data source storing the unstructured data, and wherein the obtaining of the structured data and the unstructured data comprises searching metadata to locate the key in first corresponding metadata of the structured data and in second corresponding metadata of the unstructured data; and generating, by a processing device, the results page corresponding to the key by populating the results page template with the default data and equipment related results for the query, the equipment related results comprising the structured data that is associated with the equipment and the unstructured data that is associated with the equipment; and providing the results page corresponding to the key via a graphical user interface (GUI).

2. The method of claim 1, wherein the default data comprises at least one of an image, a part number, a part name, a part description, a product identifier, an equipment identifier, or a process name that correspond to the key, wherein each search term of the first set of search terms is a variation of the key.

3. The method of claim 1, wherein a plurality of results page templates comprises the results page template, wherein each of the plurality of results page templates corresponds to the respective topic, and wherein the retrieving of the results page template comprises determining that the results page template corresponds to the first topic.

4. The method of claim 1 further comprising:
storing the results page for the key;
receiving second input of a second search term for a second query;
determining the key is mapped to the second search term;
accessing page tracking data to determine the results page has been stored for the key; and
retrieving the results page for the key from a corresponding page location.

5. The method of claim 4, wherein the page tracking data comprises a list of page identifiers, corresponding keys, and corresponding page locations comprising the corresponding page location.

6. The method of claim 1, further comprising:
receiving user input to change at least a portion of the equipment related results in the results page, the user input comprising user-provided content;
classifying the user-provided content based on the results page;
storing the user-provided content in the data source storing the structured data or in the data source storing the unstructured data; and
changing the at least a portion of the equipment related results in the results page to display the user input in the results page.

7. A non-transitory computer-readable storage medium including instructions that, when executed by a processing device, cause the processing device to perform operations comprising:
receiving first input of a search term for a query, wherein the search term is related to equipment;
identifying a key mapped to a first set of search terms comprising the search term, wherein the key corresponds to a first topic, and wherein each of a plurality of sets of default data corresponds to a respective topic;
responsive to determining that a results page corresponding to the key was not stored, retrieving, from one or more data stores, a results page template and default data that correspond to the key, wherein the retrieving of the default data comprises determining that the default data corresponds to the first topic, and wherein the plurality of sets of default data comprise the default data;
obtaining structured data and unstructured data that are associated with the equipment, wherein the structured data is obtained from a data source storing the structured data, wherein the unstructured data is obtained from a data source storing the unstructured data, and wherein the obtaining of the structured data and the unstructured data comprises searching metadata to locate the key in first corresponding metadata of the structured data and in second corresponding metadata of the unstructured data; and
generating, by the processing device, the results page corresponding to the key by populating the results page template with the default data and equipment related results for the query, the equipment related results comprising the structured data that is associated with the equipment and the unstructured data that is associated with the equipment; and
providing the results page corresponding to the key via a graphical user interface (GUI).

8. The non-transitory computer-readable storage medium of claim 7, wherein the default data comprises at least one of an image, a part number, a part name, a part description, a product identifier, an equipment identifier, or a process name that correspond to the key, wherein each search term of the first set of search terms is a variation of the key.

9. The non-transitory computer-readable storage medium of claim 7, wherein a plurality of results page templates comprises the results page template, wherein each of the plurality of results page templates corresponds to the respective topic, and wherein the retrieving of the results page template comprises determining that the results page template corresponds to the first topic.

10. The non-transitory computer-readable storage medium of claim 7, the operations further comprising:
storing the results page for the key;
receiving second input of a second search term for a second query;
determining the key is mapped to the second search term;
accessing page tracking data to determine the results page has been stored for the key; and
retrieving the results page for the key from a corresponding page location.

11. The non-transitory computer-readable storage medium of claim 10, wherein the page tracking data comprises a list of page identifiers, corresponding keys, and corresponding page locations comprising the corresponding page location.

12. The non-transitory computer-readable storage medium of claim 7, the operations further comprising:

receiving user input to change at least a portion of the equipment related results in the results page, the user input comprising user-provided content;

classifying the user-provided content based on the results page;

storing the user-provided content in the data source storing the structured data or in the data source storing the unstructured data; and changing the at least a portion of the equipment related results in the results page to display the user input in the results page.

13. A system comprising:

a memory to store a plurality of keys; and a processing device coupled to the memory to:

receive first input of a search term for a query, wherein the search term is related to equipment;

identify a key of the plurality of keys, the key being mapped to a first set of search terms comprising the search term, wherein the key corresponds to a first topic, and wherein each of a plurality of sets of default data corresponds to a respective topic;

responsive to determining that a results page corresponding to the key was not stored, retrieve, from one or more data stores, a results page template and default data that correspond to the key, wherein to retrieve the default data, the processing device is to determine that the default data corresponds to the first topic, and wherein the plurality of sets of default data comprise the default data;

obtain structured data and unstructured data that are associated with the equipment, wherein the structured data is obtained from a data source storing the structured data, wherein the unstructured data is obtained from a data source storing the unstructured data, and wherein to obtain the structured data and the unstructured data, the processing device is to search metadata to locate the key in first corresponding metadata of the structured data and in second corresponding metadata of the unstructured data; and generate, by the processing device, the results page corresponding to the key by populating the results page template with the default data and equipment related results for the query, the equipment related results comprising the structured data that is associated with the equipment and the unstructured data that is associated with the equipment; and provide the results page corresponding to the key via a graphical user interface (GUI).

14. The system of claim 13, wherein the default data comprises at least one of an image, a part number, a part name, a part description, a product identifier, an equipment identifier, or a process name that correspond to the key, wherein each search term of the first set of search terms is a variation of the key.

15. The system of claim 13, wherein a plurality of results page templates comprises the results page template, wherein each of the plurality of results page templates corresponds to a topic, and wherein to retrieve the results page template, the processing device is to determine the results page template corresponds to the first topic.

16. The system of claim 13, wherein the processing device is further to:

store the results page for the key;

receive second input of a second search term for a second query;

determine the key is mapped to the second search term;

access page tracking data to determine the results page has been stored for the key; and retrieve the results page for the key from a corresponding page location, wherein the page tracking data comprises a list of page identifiers, corresponding keys, and corresponding page locations comprising the corresponding page location.

17. The system of claim 13, wherein the processing device is further to:

receive user input to change at least a portion of the equipment related results in the results page, the user input comprising user-provided content;

classify the user-provided content based on the results page;

store the user-provided content in the data source storing the structured data or in the data source storing the unstructured data; and change the at least a portion of the equipment related results in the results page to display the user input in the results page.

* * * * *